N. B. Sherwood
Cotton Planter

No. 75207            Patented Mar. 3, 1868

Witnesses
Ira A. Hibbard
J. W. Rist

Inventor:
N. B. Sherwood
By Wm. S. Laughborough Atty

United States Patent Office.

N. B. SHERWOOD, OF MILLVILLE, NEW YORK.

*Letters Patent No. 75,207, dated March 3, 1868.*

---

IMPROVEMENT IN COTTON-SEED PLANTERS.

---

The Schedule referred to in these Letters Patent and making part of the same.

---

TO ALL WHOM IT MAY CONCERN:

Be it known that I, N. B. SHERWOOD, of Millville, in the county of Orleans, and State of New York, have invented certain new and useful "Improvements in Cotton-Seed Planters;" and I do hereby declare that the following is a full, clear, and exact description thereof, reference being had to the accompanying drawings, making part of this specification, in which—

Like letters indicate corresponding parts in both figures.

This invention relates to improvements upon the seed-distributers presented in my two former patents of June 5, 1866; and its nature consists in substituting for the carrier-belt of cotton-seed planters one or more flat-link chains running over suitable driving-pulleys, and carrying the seed-conveyers.

To enable others to make and use my invention, I will describe its construction and operation.

Figure 1:
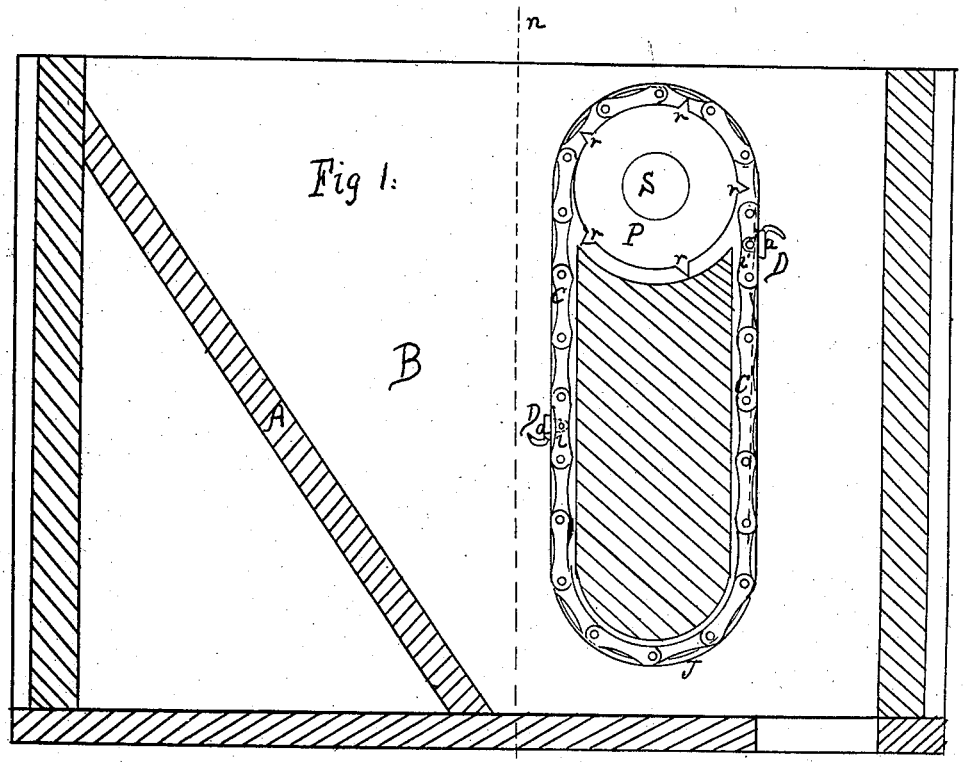
Figure 1 is a vertical section of my invention, taken in the plane of the red line $x$ in fig. 2.
Figure 2:
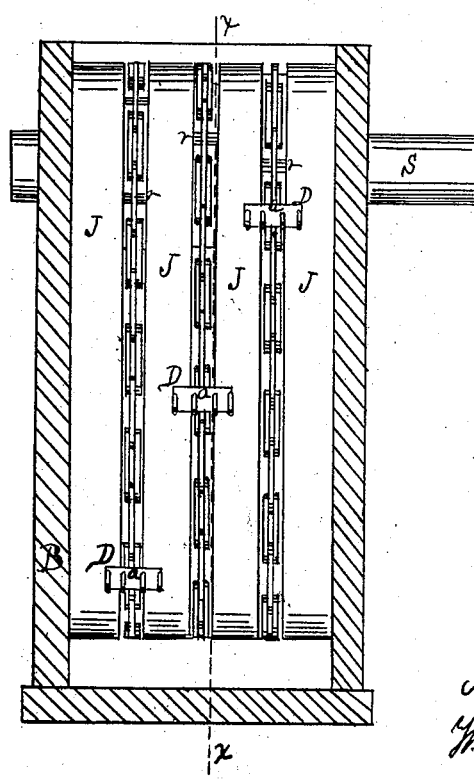
Figure 2 is a transverse section of the seed-box B, taken in the plane of the red line $n$ in fig. 1.

I use the same seed-box, B, and follower-board, A, as shown and described in my former patents, together with the separating and delivery-brushes, not shown in this case. Instead of the carrier-belt then used, I attach each cluster of teeth, D, which constitute the seed-conveyers, to a plate, $a$, having a shank, shown at $i$, fig. 1, which is pivoted between the two plates of a double link of the chain. One great objection to the former belts was the great difficulty experienced in preventing them from slipping, in which case the seed was not "paid out" with any regularity; but these chains are found to entirely obviate this difficulty.

There may be several conveyers attached to each chain, and so arranged that those of the several chains, if more than one is used, shall follow each other diagonally across the vertical surface, up which the seed is carried for delivery.

The chains C are driven by the V-shaped teeth $r$ of the pulleys P, hung upon the driving-shaft S. The slack of the chains is taken up by filling the space below the pulleys with wood, if desired, and cutting grooves in it for the chains to run in, and the spaces between the chains may be fixed by metallic bands J. If desired, these bands might be made wide enough to cover the whole space, except that in the track of the centre links of the chains, which would only leave an opening for the shanks $i$ of the teeth-plates $a$ to pass through. This construction leaves no recesses for the seed to lodge in, and consequently the machine will not clog.

There may be one or more fingers attached to the side-chains, to act as stirrers to loosen the seed between the track of the teeth and the side of the box B. But one chain might be used by hanging part of the conveyers D upon proper offsets, so as to sweep the entire width of the seed-box.

Any flexible band or a rope might be used as carriers instead of the chains, if run in serrated grooves in the driving-pulley. The driving-shaft S may be connected to one of the ground-wheels of the machine by gearing.

By connecting to one side of the seed-box B a narrow box and one chain, with suitable conveyers attached, the same machine may be used as a corn-planter.

What I claim as my invention, and desire to secure by Letters Patent, is—

1. The construction and relative arrangement, in connection with the chains, of the conveyer D, substantially in the manner and for the purposes herein shown and described.

2. The application of the flat-link chains C, with conveyers D attached, to cotton-seed planters, substantially in the manner and for the purposes shown and described.

3. The sunken channels within the drums P, and the surface-board J, for the carrier-chains C, or their equivalents, to travel in, for the purposes herein shown and described.

N. B. SHERWOOD.

Witnesses:
WM. S. LOUGHBOROUGH,
A. H. BILLINGS.